United States Patent
Chau et al.

(10) Patent No.: US 6,437,950 B1
(45) Date of Patent: Aug. 20, 2002

(54) TOP SPIN VALVE SENSOR THAT HAS AN IRIDIUM MANGANESE (IRMN) PINNING LAYER AND AN IRIDIUM MANGANESE OXIDE (IRMNO) SEED LAYER

(75) Inventors: Phong Chau, San Jose; Mustafa Pinarbasi, Morgan Hill; Hua A. Zeng; Patrick Rush Webb, both of San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 09/687,404

(22) Filed: Oct. 12, 2000

(51) Int. Cl.[7] .................................................. G11B 5/39
(52) U.S. Cl. .............................. 360/324.11; 360/324.12
(58) Field of Search ........................... 360/324.1, 324.11, 360/324.12, 324.2

(56) References Cited

U.S. PATENT DOCUMENTS 5,528,440 A * 6/1996 Fontana et al. ............. 324/252
6,175,477 B1 * 1/2001 Lin et al. ................. 360/324.12
6,208,492 B1 * 3/2001 Pinarbasi ................. 360/324.11
6,222,707 B1 * 4/2001 Huai et al. ................. 360/324.1
6,275,362 B1 * 8/2001 Pinarbasi ................. 360/324.12
6,317,299 B1 11/2001 Pinarbasi ................. 360/324.11

OTHER PUBLICATIONS

U.S. application No. 09/434,779, filed Nov. 5, 1999, Pinarbasi.

* cited by examiner

Primary Examiner—David L. Ometz
(74) Attorney, Agent, or Firm—Ervin F. Johnston

(57) ABSTRACT

A top spin valve sensor includes an iridium manganese (IrMn) pinning layer which has been formed by ion beam sputter deposition. The magnetoresistive coefficient of the spin valve sensor is increased by employing an iridium manganese oxide (IrMnO) seed layer between a free layer of the spin valve sensor and a first read gap layer of the read head. The free layer is preferably a nickel iron free film located between first and second cobalt iron (CoFe) free films.

46 Claims, 8 Drawing Sheets (ABS)

TOP SPIN VALVE SENSOR THAT HAS AN IRIDIUM MANGANESE (IRMN) PINNING LAYER AND AN IRIDIUM MANGANESE OXIDE (IRMNO) SEED LAYER

BACKGROUND OF THE INVENTION

1. Field of the Invention

The present invention relates to a top spin valve sensor that has an iridium manganese (IrMn) pinning layer and an iridium manganese oxide (IrMnO) seed layer and, more particularly, to such a top spin valve sensor which has an improved magnetoresistive coefficient even though the iridium manganese (IrMn) pinning layer is formed by ion beam sputter deposition.

2. Description of the Related Art

A spin valve sensor is employed by a read head for sensing magnetic signal fields from a moving magnetic medium, such as a rotating magnetic disk. The sensor includes a nonmagnetic electrically conductive first spacer layer sandwiched between a ferromagnetic pinned layer and a ferromagnetic free layer. An antiferromagnetic pinning layer interfaces the pinned layer for pinning a magnetic moment of the pinned layer 90° to an air bearing surface (ABS) wherein the ABS is an exposed surface of the sensor that faces the magnetic disk. First and second leads are connected to the spin valve sensor for conducting a sense current therethrough. A magnetic moment of the free layer is free to rotate upwardly and downwardly with respect to the ABS from a quiescent or bias point position in response to positive and negative magnetic field signals from a rotating magnetic disk. The quiescent position, which is preferably parallel to the ABS, is the position of the magnetic moment of the free layer with the sense current conducted through the sensor in the absence of field signals.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with the pinned and free layers. When the magnetic moments of the pinned and free layers are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layers. The sensitivity of the sensor is quantified as magnetoresistive coefficient dr/R where dr is the change in the resistance of the sensor as the magnetic moment of the free layer rotates from a position parallel with respect to the magnetic moment of the pinned layer to an antiparallel position with respect thereto and R is the resistance of the sensor when the magnetic moments are parallel.

A read head in a magnetic disk drive of a computer includes the spin valve sensor as well as nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is first formed followed by formation of the first read gap layer, the spin valve sensor, the second read gap layer and the second shield layer. Spin valve sensors are classified as a top or a bottom spin valve sensor depending upon whether the pinning layer is located at the bottom of the sensor next to the first read gap layer or at the top of the sensor closer to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel.

The storage capacity of a magnetic disk drive in a computer is directly dependent upon the areal density of each of the write head and the read head. When the areal density is increased the storage capacity of the computer is increased. Areal density is a product of the linear bit density and track width density. Linear bit density is measured in bits per inch (BPI) along a track of a magnetic disk and the track width density is measured in tracks per inch (TPI) across the width of the tracks on the magnetic disk. The linear bit density of a read head is determined by the spacing between the first and second shield layers. This spacing, in turn, is dependent upon the thickness of the spin valve sensor and the first and second read gap layers. When this thickness increases the linear bit density decreases. Accordingly, it is highly desirable that the distance between the first and second shield layers be minimized.

The thickest layer in a spin valve sensor is typically the pinning layer. For instance, a nickel manganese pinning layer must be about 250 Å in order to pin the pinned layer, a platinum manganese (PtMn) pinning layer must be about 180 Å in order to pin the pinned layer and a nickel oxide (NiO) pinning layer must be about 425 Å in order to pin the pinning layer. An exceptionally thin pinning layer, which is capable of pinning the pinned layer with only the thickness of 60 Å, is iridium manganese (IrMn). While this pinning layer is highly desirable from the standpoint of reducing the read gap between the first and second shield layers, the magnetoresistive coefficient dr/R of the sensor has been relatively low when the iridium manganese (IrMn) pinning layer is formed by ion beam sputter deposition. Ion beam sputter deposition is a highly desirable method of forming layers of a spin valve sensor because its yield is significantly greater than standard sputter deposition techniques. Accordingly, it would be desirable if iridium manganese (IrMn) could be used as a pinning layer, provided the read head had a relatively high magnetoresistive coefficient dr/R when the pinning layer is formed by ion beam sputter deposition. It should be noted that when the magnetoresistive coefficient dr/R is increased that the linear bit density is still further increased since the read head has an improved read signal and can read more bits per linear inch along the track.

SUMMARY OF THE INVENTION

The present invention has provided a read head with improved magnetoresistive coefficient dr/R even though an iridium manganese (IrMn) pinning layer has been formed by ion beam sputter deposition. This has been accomplished in a top spin valve sensor by providing a seed layer of iridium manganese oxide (IrMnO) between the first read gap layer and the free layer. Without the seed layer the magnetoresistive coefficient was found to be between 6% and 7%, in one embodiment of the invention with the iridium manganese oxide (IrMnO) seed layer the magnetoresistive coefficient dr/R was increased to 7.4% and in a second embodiment of the invention with the iridium manganese oxide (IrMnO) seed layer the magnetoresistive coefficient dr/R was significantly increased to 8.65%.

An object of the present invention is to provide a read head with improved magnetoresistive coefficient dr/R when a spin valve in the read head has an iridium manganese (IrMn) pinning layer which has been formed by ion beam sputter deposition.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
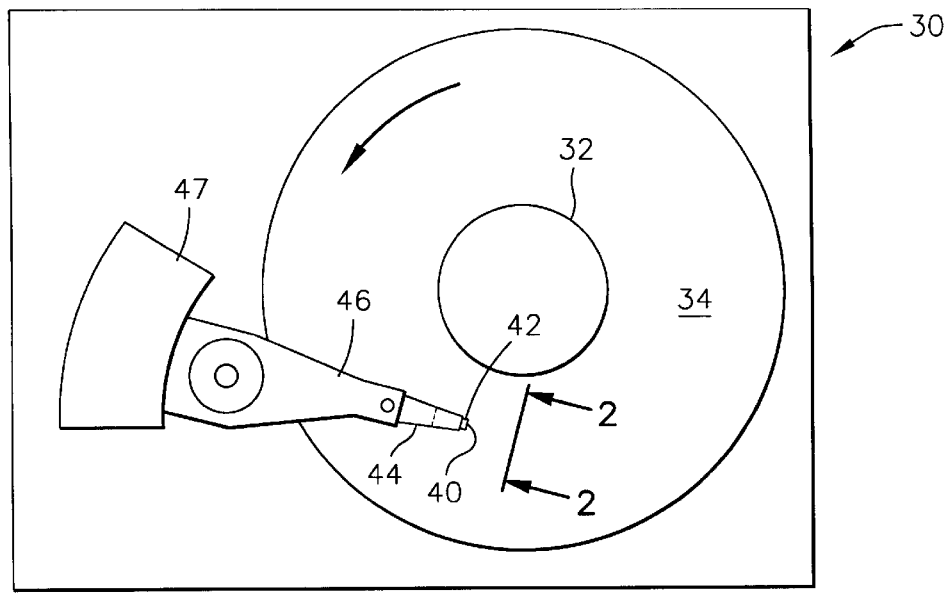
FIG. 1 is a planar view of an exemplary magnetic disk drive.
Figure 2:
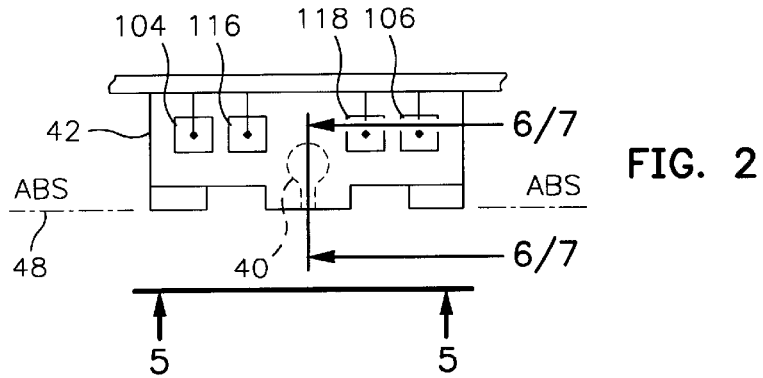
FIG. 2 is an end view of a slider with a magnetic head of the disk drive as seen in plane 2—2.
Figure 3:
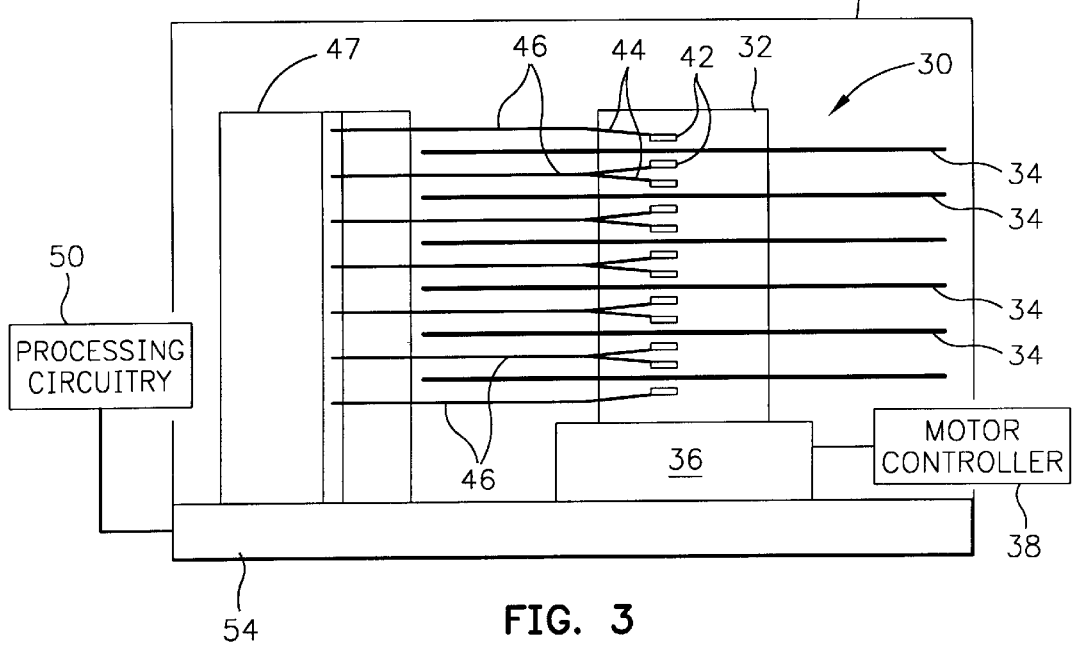
FIG. 3 is an elevation view of the magnetic disk drive wherein multiple disks and magnetic heads are employed.
Figure 4:
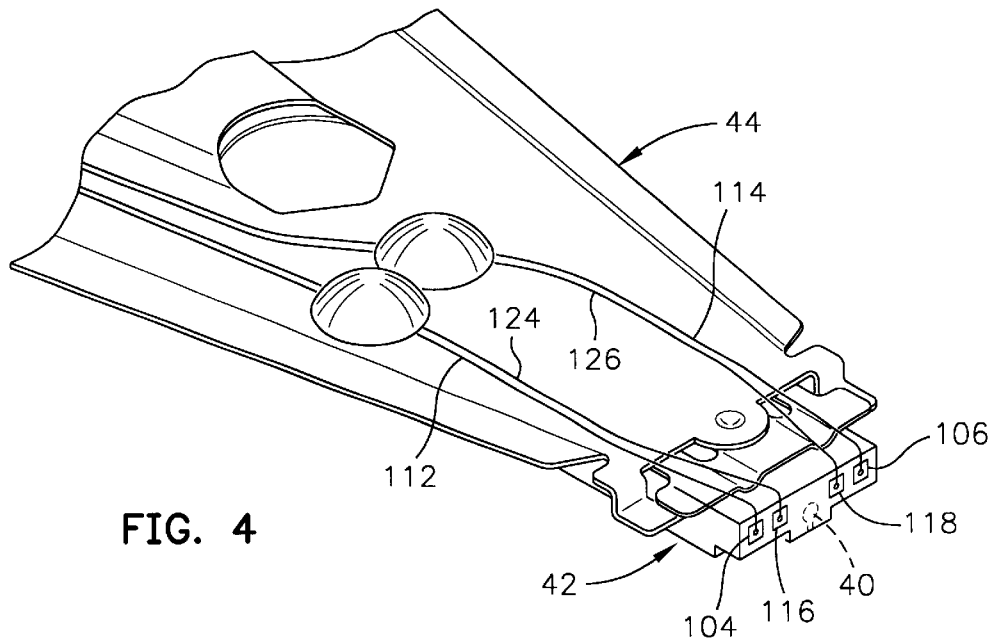
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
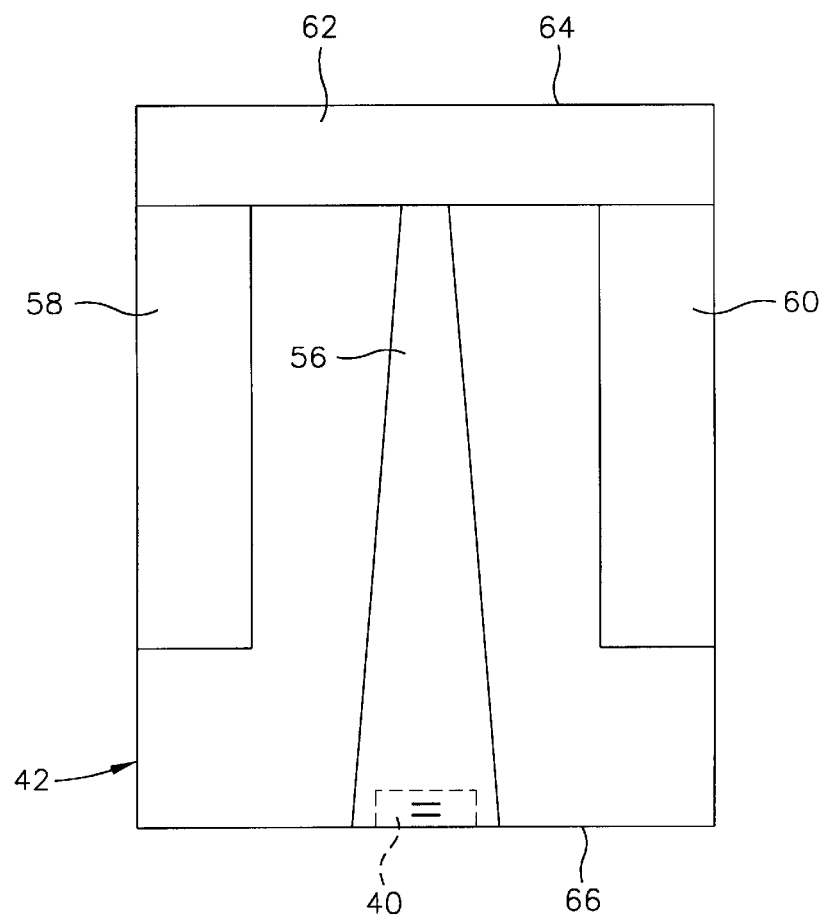
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
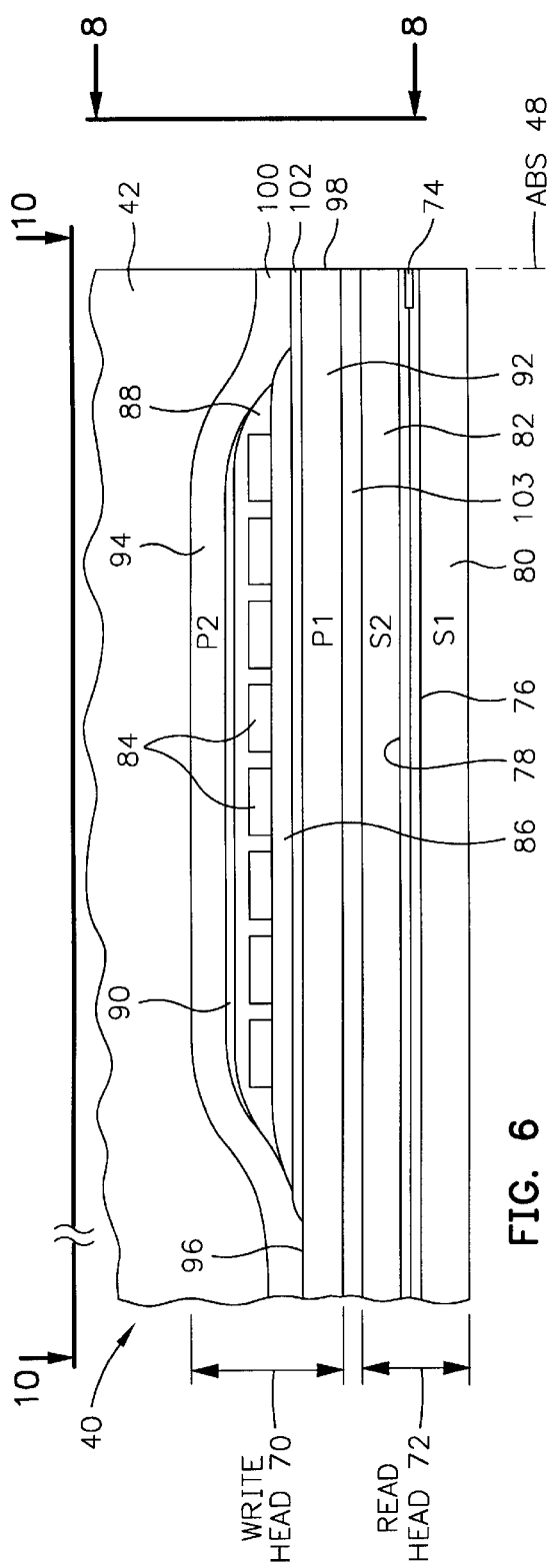
FIG. 6 is a partial view of the slider and a piggyback magnetic head as seen in plane 6—6 of FIG. 2.
Figure 8:
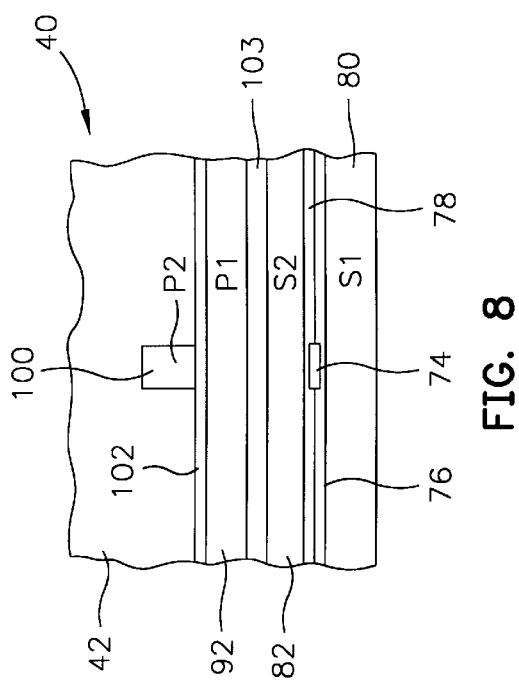
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes which are processed as readback signals by the processing circuitry 50 shown in FIG. 3.

Figure 10:
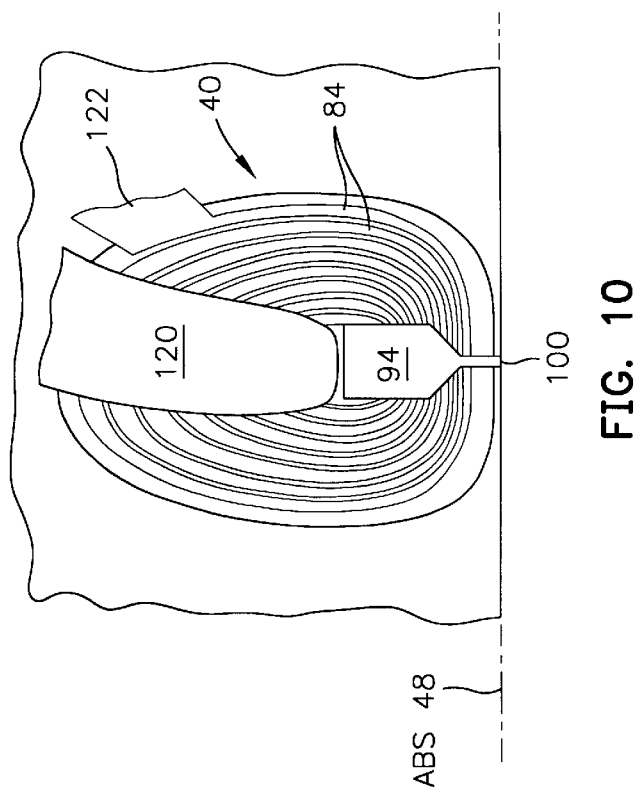
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulative isolation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
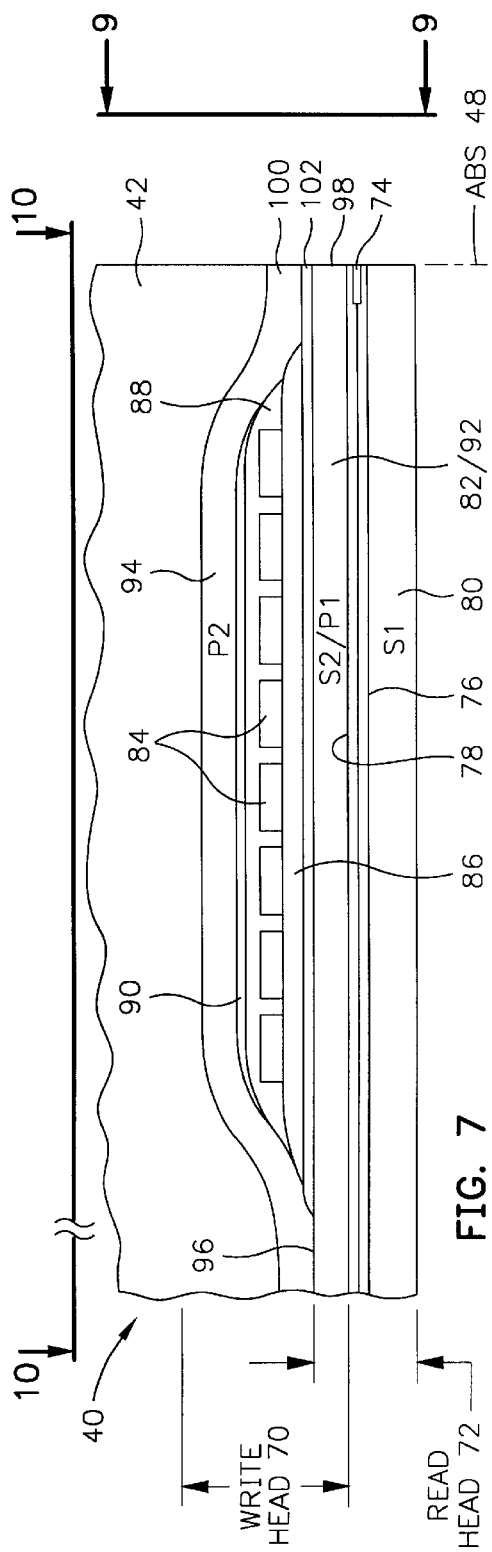
FIG. 7 is a partial view of the slider and a merged magnetic head as seen in plane 7—7 of FIG. 2.
Figure 9:
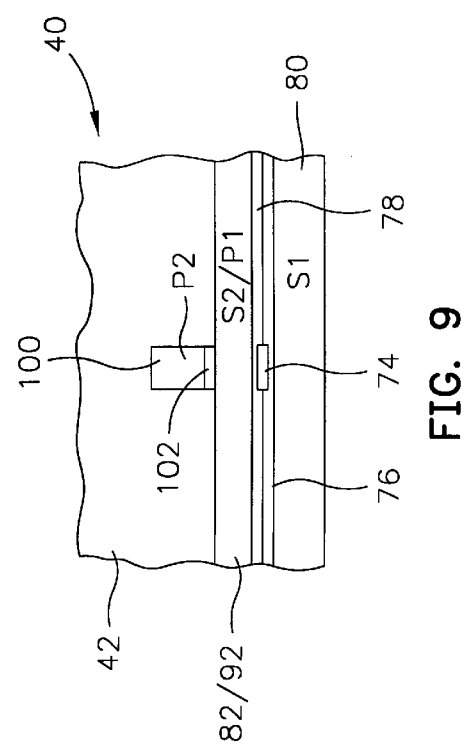
FIG. 9 is a partial ABS view of the slider taken along plane. 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
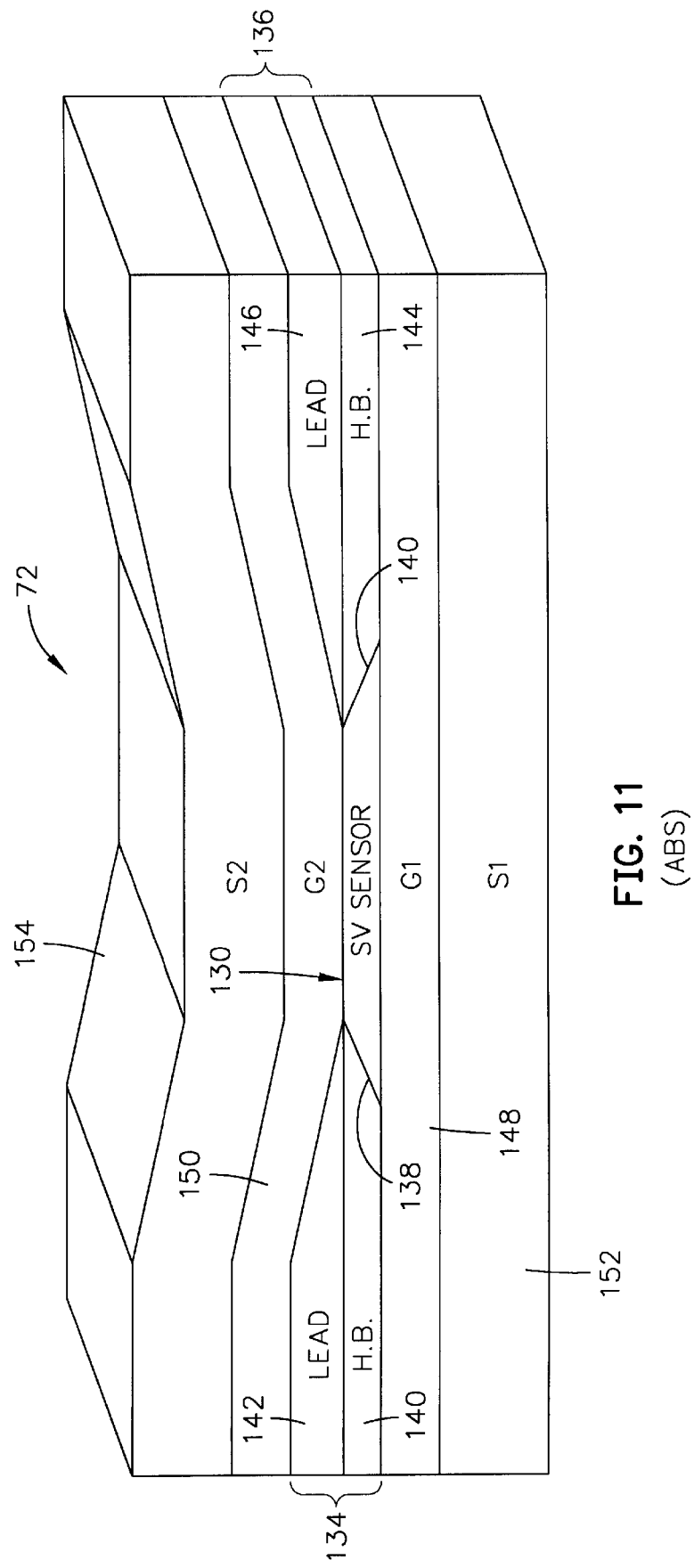
FIG. 11 is an isometric ABS illustration of an exemplary read head which employs a top spin valve sensor longitudinally biased by hard biasing layers.

FIG. 11 is an isometric ABS illustration of a read head 72 which has a top spin valve sensor 130. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

EXAMPLE 1

Comparative Example

Figure 12:
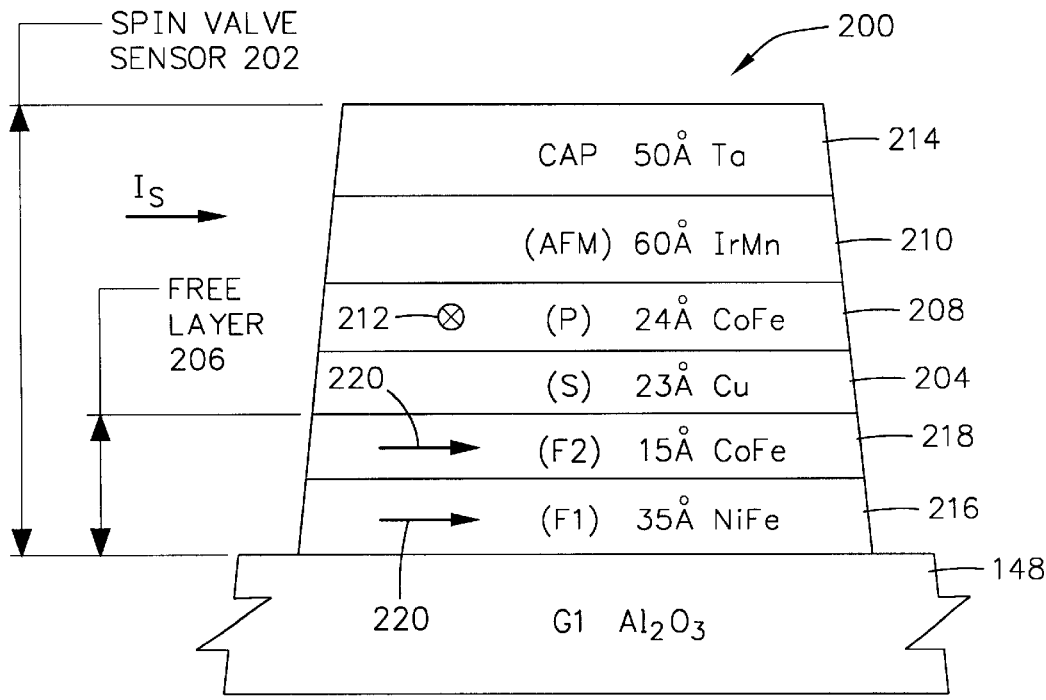
FIG. 12 is an ABS illustration of a comparative example of a top spin valve sensor.

FIG. 12 illustrates a read head 200 with a top spin valve sensor 202. The sensor 202 includes a nonmagnetic electrically conductive spacer layer (S) 204 which is located between a free layer 206 and a pinned layer 208. An antiferromagnetic (AFM) pinning layer 210, which is composed of iridium manganese (IrMn), interfaces and is exchange coupled to the pinned layer 208 for pinning a magnetic moment 212 of the pinned layer perpendicular to the ABS in a direction either out of the spin valve sensor or into the spin valve sensor, as shown in FIG. 12. A cap layer 214 is provided on the pinning layer 210 for the purpose of protecting it from subsequent processing steps. The free layer 206 has a first free film (F1) 216 composed of nickel iron (NiFe) and a second free film (F2) 218 composed of cobalt iron (CoFe) with the first free film 216 located between the first read gap layer (G1) 148 and the second free film 218. The free layer has a magnetic moment 220 which is parallel to the ABS and is either directed from right to left or from left to right, as shown in FIG. 12. When magnetic flux from a rotating magnetic disk rotates the magnetic moment into the sensor the magnetic moments 220 and 212 become more parallel which reduces the resistance of the sensor to the sense current $I_S$ and when magnetic flux rotates the magnetic moment 220 out of the sensor the magnetic moments 220 and 212 become more antiparallel which increases the resistance of the spin valve sensor to the sense current $I_S$. These changes in resistance are processed by the processing circuitry 50 in FIG. 3 as playback signals.

The thicknesses of the various layers of the spin valve sensor and the material are 35 Å of nickel iron (NiFe) for the first free layer 216, 15 Å of cobalt iron (CoFe) for the second free layer 218, 23 Å of copper (Cu) for the spacer layer 204, 24 Å of cobalt iron (CoFe) for the pinning layer 208, 60 Å of iridium manganese (IrMn) for the pinning layer 210 and 50 Å of tantalum (Ta) for the cap layer 214. The spin valve sensor shown in FIG. 12 was tested in the read head shown in FIG. 11 and its magnetoresistive coefficient dr/R was found to vary between 6% to 7%. All of the layers of the spin valve sensor, including the iridium manganese (IrMn) pinning layer 210, were formed by ion beam sputter deposition.

The Invention

EXAMPLE 2

Figure 13:
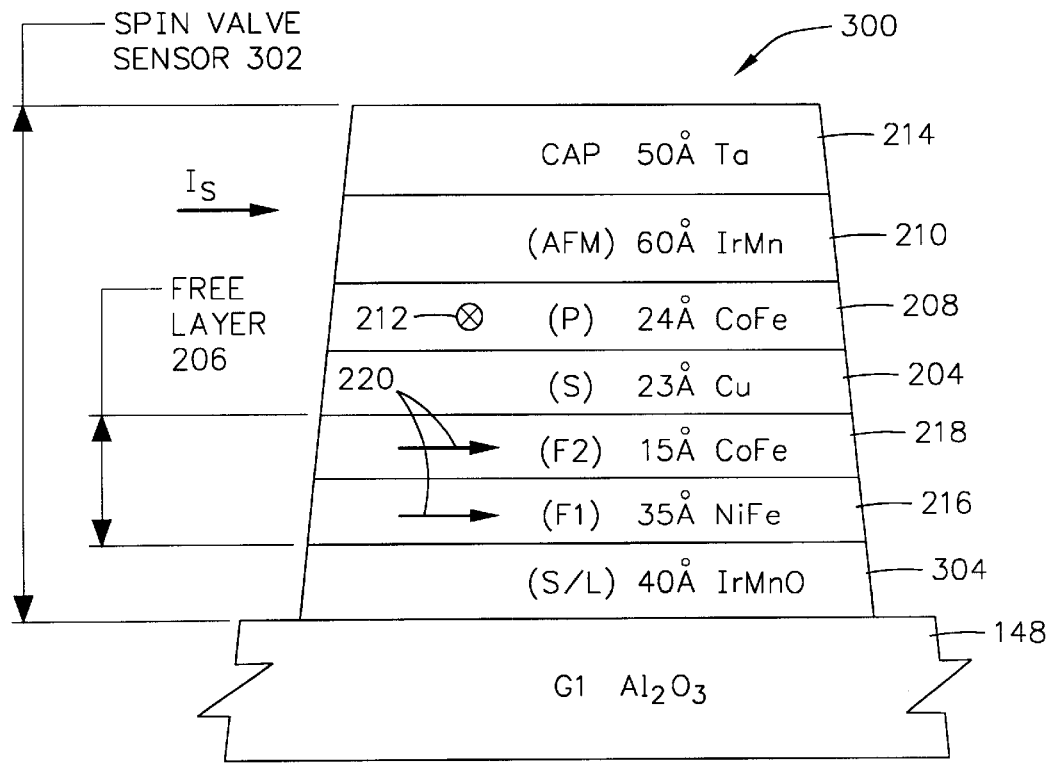
FIG. 13 is an ABS illustration of a first embodiment of the present top spin valve sensor.

FIG. 13 illustrates a first embodiment of the present read head 300 with a spin valve sensor 302. The spin valve sensor 302 was the same as the spin valve sensor 202 in FIG. 12 except a seed layer composed of iridium manganese oxide (IrMnO) was employed between the first read gap layer 148 and the first free film 216 of the free layer. The iridium manganese oxide (IrMnO) seed layer was 40 Å thick. Upon testing the spin valve sensor 302 in the magnetic head shown in FIG. 11, the magnetoresistive coefficient dr/R averaged 7.4%. All of the layers, including the iridium manganese oxide (IrMnO) seed layer 304 and the iridium manganese (IrMn) pinning layer 210, were formed by ion beam sputter deposition. It can be seen from this example that the magnetoresistive coefficient dr/R of the first embodiment 300 of the present invention increased as compared to the magnetoresistive coefficient dr/R of the read head 200 in FIG. 2 without the iridium manganese oxide (IrMnO) seed layer.

EXAMPLE 3

Figure 14:
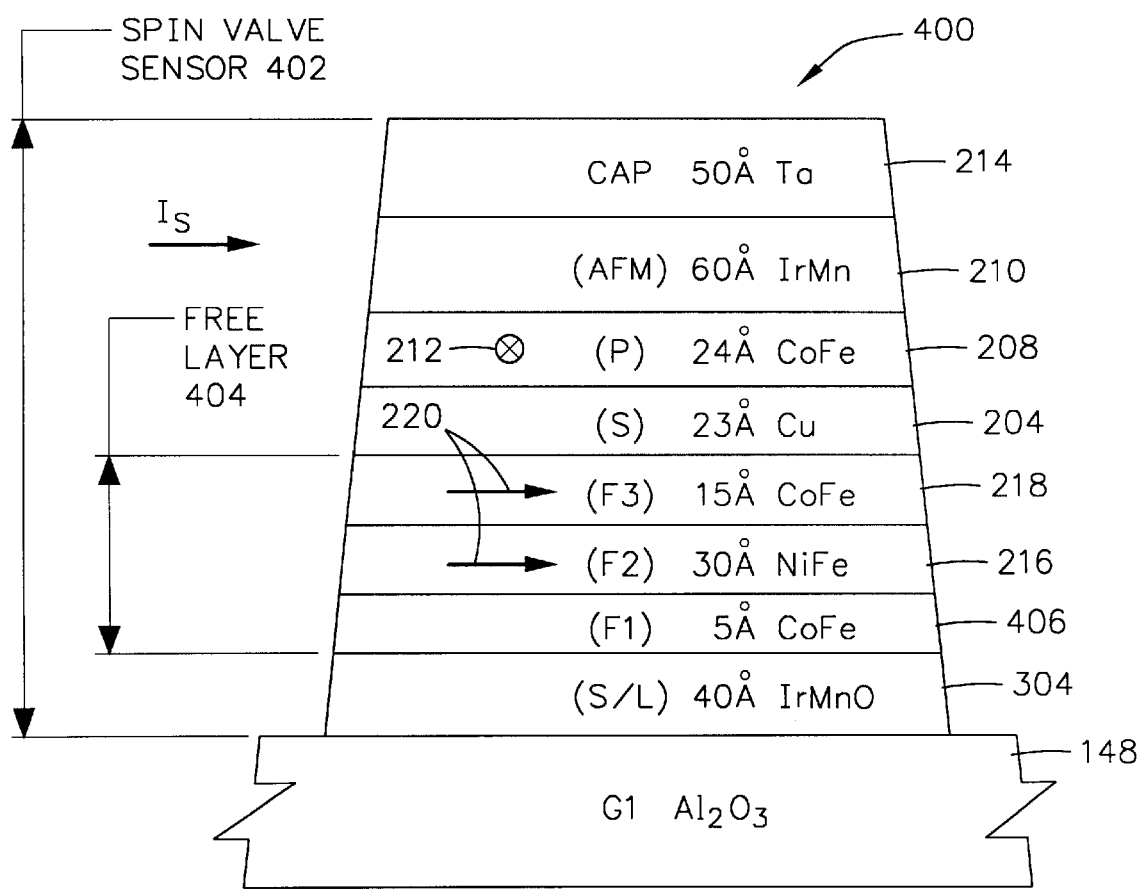
FIG. 14 is an ABS illustration of a second embodiment of the present top spin valve sensor.

FIG. 14 shows a second embodiment of the read head 400 with a spin valve sensor 402. The spin valve sensor 402 is the same as the spin valve sensor 302 in FIG. 13 except a free layer 404 was provided with a first free film 406 which is composed of cobalt iron (CoFe). The nickel iron (NiFe) film 216 is now a second free film (F2) and the original cobalt iron (CoFe) free film 218 is now a third free film (F3) with the second free film 216 of nickel iron (NiFe) being located between the first and third free films 406 and 218 of cobalt iron. The thickness of the first free film 406 is 5 Å. Upon testing the read head 400 shown in FIG. 14, the average magnetoresistive coefficient dr/R was 8.65%. This is a significant increase over the read head 200 in FIG. 12 without the iridium manganese oxide (IrMnO) seed layer. Accordingly, the preferred embodiment of the present invention is the embodiment 400 shown in FIG. 14. All of the layers of the spin valve sensor 402 in FIG. 14 were formed by ion beam sputter deposition, including the iridium manganese oxide (IrMnO) seed layer 304 and the iridium manganese (IrMn) pinning layer 210.

Method of the Invention

Figure 15:
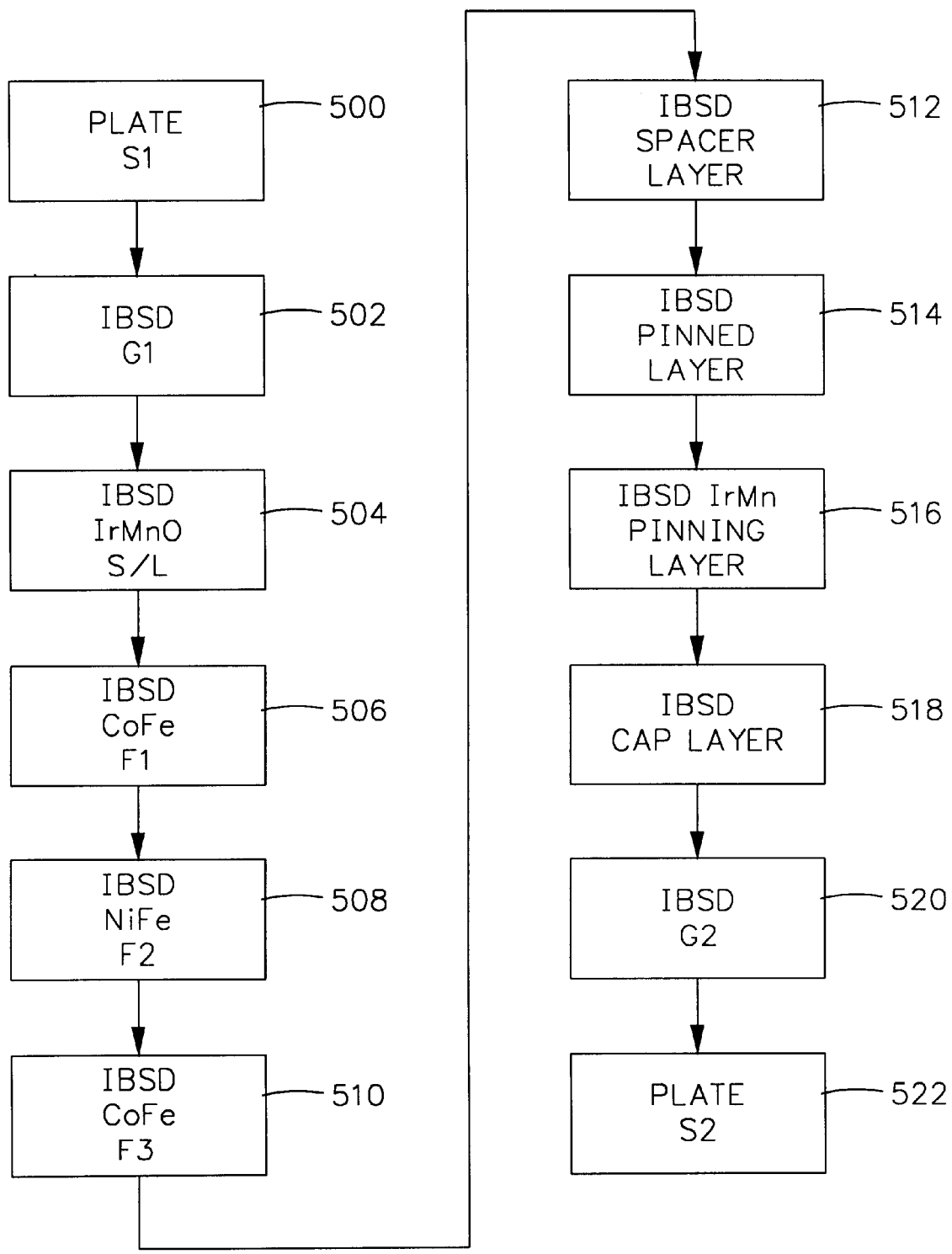
FIG. 15 is a block diagram illustrating a method of the present invention.

FIG. 15 shows an exemplary method of the invention wherein the first shield layer 152 in FIG. 11 may be formed by plating as illustrated in block 500, the first read gap layer 148 may be ion beam sputter deposited (IBSD) as shown in block 502, the iridium manganese oxide (IrMnO) seed layer 304 in FIG. 14 may be ion beam sputter deposited as shown in block 504, the cobalt iron (CoFe) first free film (F1) may be formed by ion beam sputter deposition as shown in block 506, the nickel iron (NiFe) second free film (F2) may be formed by ion beam sputter deposition as shown in block 508, the cobalt iron (CoFe) third free film (F3) may be formed by ion beam sputter deposition as shown in block 510, the spacer layer 204 may be formed by ion beam sputter deposition as shown in block 512, the pinned layer 208 may be formed by ion beam sputter deposition as shown in block 514, the iridium manganese (IrMn) pinning layer 210 is formed by ion beam sputter deposition as shown in block 516, the cap layer 214 may be formed by ion beam sputter deposition as shown in block 518, the second read gap layer 150 in FIG. 11 may be formed by ion beam sputter deposition as shown in block 520 and the second shield layer 154 may be formed by plating as shown in block 522. The parameters of the ion beam sputter deposition were as follows for the iridium manganese (IrMn) pinning layer: the target was iridium manganese (IrMn), an ion beam gun directed xenon (Xe) ions onto the target, the power of the ion beam gun was 750 eV, and the pressure in the chamber was $1.0 \times 10^{-4}$ torr.

Discussion

It should be understood that the thicknesses of the various layers in the first and second embodiments 200 and 300 may be varied as desired without departing from the spirit of the invention. Further, cobalt (Co) may be substituted for the cobalt iron (CoFe) layers, however, the cobalt iron (CoFe) layers are preferred. The atomic composition of the nickel iron layer was $Ni_{82}Fe_{18}$, the atomic composition of the cobalt iron was $Co_{90}Fe_{10}$ and the atomic composition of the iridium manganese was $Ir_{20}Mn_{80}$. When IrMnO material is formed by ion beam sputter deposition the working gas includes $2 \times 10^{-5}$ torr partial pressure of oxygen in the chamber.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic read head which has an air bearing surface (ABS), comprising:
   a spin valve sensor including:
      a ferromagnetic pinned layer structure that has a magnetic moment;
      an iridium manganese (IrMn) pinning layer exchange coupled to the pinned layer structure for pinning the magnetic moment of the pinned layer structure;
      a free layer;
      a nonmagnetic conductive spacer layer located between the free layer and the pinned layer structure;
      an iridium manganese oxide (IrMnO) seed layer; and
      the free layer being located between the seed layer and the spacer layer.

2. A magnetic read head as claimed in claim 1 including:
   nonmagnetic nonconductive first and second read gap layers;
   the spin valve sensor being located between the first and second read gap layers;
   ferromagnetic first and second shield layers;
   the first and second read gap layers being located between the first and second shield layers; and
   the seed layer being located between the first read gap layer and the free layer.

3. A magnetic read head as claimed in claim 2 wherein the free layer includes:
   a first free film composed of nickel iron (NiFe);
   a second free film composed of cobalt iron (CoFe); and
   the first film being located between the seed layer and the second free film.

4. A magnetic read head as claimed in claim 3 wherein a thickness of the pinning layer is 60 Å.

5. A magnetic read head as claimed in claim 4 wherein a thickness of the seed layer is 40 Å.

6. A magnetic read head as claimed in claim 2 wherein the free layer includes:
   a first free film composed of cobalt iron (CoFe);
   a second free film composed of nickel iron (NiFe);
   a third free film composed of cobalt iron (CoFe); and
   the second free film being located between the first and third free films and the first free film being located between the seed layer and the second free film.

7. A magnetic read head as claimed in claim 6 wherein a thickness of the pinning layer is 60 Å.

8. A magnetic read head as claimed in claim 7 wherein a thickness of the seed layer is 40 Å.

9. A magnetic head assembly having an air bearing surface (ABS), comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      a spin valve sensor;
      nonmagnetic nonconductive first and second read gap layers;
      the spin valve sensor being located between the first and second read gap layers;
      a ferromagnetic first shield layer; and
      the first and second gap layers being located between the first shield layer and the first pole piece layer; and
   the spin valve sensor including:
      a ferromagnetic pinned layer structure that has a magnetic moment;
      an iridium manganese (IrMn) pinning layer exchange coupled to the pinned layer structure for pinning the magnetic moment of the pinned layer structure;
      a free layer;
      a nonmagnetic conductive spacer layer located between the free layer and the pinned layer structure;
      an iridium manganese oxide (IrMnO) seed layer; and
      the free layer being located between the seed layer and the spacer layer;
   the seed layer being located between the first read gap layer and the free layer.

10. A magnetic head assembly as claimed in claim 9 including:
    a ferromagnetic second shield layer; and
    a nonmagnetic nonconductive isolation layer located between the second shield layer and the first pole piece layer.

11. A magnetic head assembly as claimed in claim 9 wherein the free layer includes:
    a first free film composed of nickel iron (NiFe);
    a second free film composed of cobalt iron (CoFe); and
    the first film being located between the seed layer and the second free film.

12. A magnetic head assembly as claimed in claim 11 wherein a thickness of the pinning layer is 60 Å.

13. A magnetic head assembly as claimed in claim 12 wherein a thickness of the seed layer is 40 Å.

14. A magnetic head assembly as claimed in claim 9 wherein the free layer includes:
    a first free film composed of cobalt iron (CoFe);
    a second free film composed of nickel iron (NiFe);
    a third free film composed of cobalt iron (CoFe); and
    the second free film being located between the first and third free films and the first free film being located between the seed layer and the second free film.

15. A magnetic head assembly as claimed in claim 14 wherein a thickness of the pinning layer is 60 Å.

16. A magnetic head assembly as claimed in claim 15 wherein a thickness of the seed layer is 40 Å.

17. A magnetic disk drive including at least one magnetic head assembly that has an air bearing surface (ABS) and that includes a write head and a read head, comprising:

a write head including:
  ferromagnetic first and second pole piece layers that have a yoke portion located between a pole tip portion and a back gap portion;
  a nonmagnetic write gap layer located between the pole tip portions of the first and second pole piece layers;
  an insulation stack with at least one coil layer embedded therein located between the yoke portions of the first and second pole piece layers; and
  the first and second pole piece layers being connected at their back gap portions; and
a read head including:
  a spin valve sensor;
  nonmagnetic nonconductive first and second read gap layers;
  the spin valve sensor being located between the first and second read gap layers;
  a ferromagnetic first shield layer; and
  the first and second read gap layers being located between the first shield layer and the first pole piece layer; and
the spin valve sensor including:
  a ferromagnetic pinned layer structure that has a magnetic moment;
  an iridium manganese (IrMn) pinning layer exchange coupled to the pinned layer structure for pinning the magnetic moment of the pinned layer structure;
  a free layer;
  a nonmagnetic conductive spacer layer located between the free layer and the pinned layer structure;
  an iridium manganese oxide (IrMnO) seed layer; and
  the free layer being located between the seed layer and the spacer layer;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

18. A magnetic disk drive as claimed in claim 17 including:
  a ferromagnetic second shield layer; and
  a nonmagnetic isolation layer located between the second shield layer and the first pole piece layer.

19. A magnetic disk drive as claimed in claim 17 wherein the free layer includes:
  a first free film composed of nickel iron (NiFe);
  a second free film composed of cobalt iron (CoFe); and
  the first film being located between the seed layer and the second free film.

20. A magnetic disk drive as claimed in claim 19 wherein a thickness of the pinning layer is 60 Å.

21. A magnetic disk drive as claimed in claim 20 wherein a thickness of the seed layer is 40 Å.

22. A magnetic disk drive as claimed in claim 17 wherein the free layer includes:
  a first free film composed of cobalt iron (CoFe);
  a second free film composed of nickel iron (NiFe);
  a third free film composed of cobalt iron (CoFe); and
  the second free film being located between the first and third free films and the first free film being located between the seed layer and the second free film.

23. A magnetic disk drive as claimed in claim 22 wherein a thickness of the pinning layer is 60 Å.

24. A magnetic disk drive as claimed in claim 23 wherein a thickness of the seed layer is 40 Å.

25. A method of making a magnetic read head which has an air bearing surface (ABS), comprising the steps of:
  a making a spin valve sensor comprising the steps of:
    forming a ferromagnetic pinned layer structure that has a magnetic moment;
    forming an iridium manganese (IrMn) pinning layer exchange coupled to the pinned layer structure for pinning the magnetic moment of the pinned layer structure;
    forming a free layer;
    forming a nonmagnetic conductive spacer layer located between the free layer and the pinned layer structure;
    forming an iridium manganese oxide (IrMnO) seed layer; and
    forming the free layer being between the seed layer and the spacer layer.

26. A method of making a magnetic read head as claimed in claim 25 wherein the layers of the spin valve sensor are formed by ion beam sputter deposition.

27. A method of making a magnetic read head as claimed in claim 25 including:
  forming nonmagnetic nonconductive first and second read gap layers;
  forming the spin valve sensor between the first and second read gap layers;
  forming ferromagnetic first and second shield layers;
  forming the first and second read gap layers between the first and second shield layers; and
  forming the seed layer between the first read gap layer and the free layer.

28. A method of making a magnetic read head as claimed in claim 27 wherein the forming of the free layer includes the steps of:
  forming a first free film composed of nickel iron (NiFe);
  forming a second free film composed of cobalt iron (CoFe) with the first film being located between the seed layer and the second free film.

29. A method of making a magnetic read head as claimed in claim 28 wherein the layers of the spin valve sensor are formed by ion beam sputter deposition.

30. A method of making a magnetic read head as claimed in claim 29 wherein the pinning layer is formed with a thickness of 60 Å.

31. A method of making a magnetic read head as claimed in claim 30 wherein the seed layer is formed with a thickness of 40 Å.

32. A method of making a magnetic read head as claimed in claim 27 wherein the forming of the free layer includes:
  forming a first free film composed of cobalt iron (CoFe);
  forming a second free film composed of nickel iron (NiFe);
  forming a third free film composed of cobalt iron (CoFe) with the second free film being located between the first and third free films and the first free film being located between the seed layer and the second free film.

33. A method of making a magnetic read head as claimed in claim 32 wherein the layers of the spin valve sensor are formed by ion beam sputter deposition.

34. A method of making a magnetic read head as claimed in claim 33 wherein the pinning layer is formed with a thickness of 60 Å.

35. A method of making a magnetic read head as claimed in claim 34 wherein the seed layer is formed with a thickness of 40 Å.

36. A method of making magnetic head assembly that has an air bearing surface (ABS), comprising the steps of:

making a write head including the steps of:

forming ferromagnetic first and second pole piece layers in pole tip, yoke and back gap regions wherein the yoke region is located between the pole tip and back gap regions;

forming a nonmagnetic nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and making a read head including the steps of:

forming nonmagnetic nonconductive first and second read gap layers;

forming a spin valve sensor between the first and second read gap layers;

forming the first and second read gap layers between the first shield layer and the first pole piece layer; and a making of the spin valve sensor comprising the steps of:

forming a ferromagnetic pinned layer structure that has a magnetic moment;

forming an iridium manganese (IrMn) pinning layer exchange coupled to the pinned layer structure for pinning the magnetic moment of the pinned layer structure;

forming a free layer;

forming a nonmagnetic conductive spacer layer located between the free layer and the pinned layer structure;

forming an iridium manganese oxide (IrMnO) seed layer; and forming the free layer being between the seed layer and the spacer layer.

37. A method of making a magnetic head assembly as claimed in claim 36 including:

forming a ferromagnetic second shield layer; and forming a nonmagnetic nonconductive isolation layer between the second shield layer and the first pole piece layer.

38. A method of making a magnetic head assembly as claimed in claim 36 wherein the layers of the spin valve sensor are formed by ion beam sputter deposition.

39. A method of making a magnetic head assembly as claimed in claim 36 wherein the forming of the free layer includes the steps of:

forming a first free film composed of nickel iron (NiFe);

forming a second free film composed of cobalt iron (CoFe) with the first film being located between the seed layer and the second free film.

40. A method of making a magnetic head assembly as claimed in claim 39 wherein the layers of the spin valve sensor are formed by ion beam sputter deposition.

41. A method of making a magnetic head assembly as claimed in claim 40 wherein the pinning layer is formed with a thickness of 60 Å.

42. A method of making a magnetic head assembly as claimed in claim 41 wherein the seed layer is formed with a thickness of 40 Å.

43. A method of making a magnetic head assembly as claimed in claim 36 wherein the forming of the free layer includes:

forming a first free film composed of cobalt iron (CoFe);

forming a second free film composed of nickel iron (NiFe);

forming a third free film composed of cobalt iron (CoFe) with the second free film being located between the first and third free films and the first free film being located between the seed layer and the second free film.

44. A method of making a magnetic head assembly as claimed in claim 43 wherein the layers of the spin valve sensor are formed by ion beam sputter deposition.

45. A method of making a magnetic head assembly as claimed in claim 44 wherein the pinning layer is formed with a thickness of 60 Å.

46. A method of making a magnetic head assembly as claimed in claim 45 wherein the seed layer is formed with a thickness of 40 Å.

* * * * *